United States Patent
Zahora et al.

(10) Patent No.: US 9,450,530 B2
(45) Date of Patent: Sep. 20, 2016

(54) CONTROL FOR MULTI-PHASE INDUCTION MOTOR

(71) Applicants: Joseph A. Zahora, Oakwood, OH (US); Xung T. Bui, Dayton, OH (US); Brad S. Bryant, Yellow Springs, OH (US)

(72) Inventors: Joseph A. Zahora, Oakwood, OH (US); Xung T. Bui, Dayton, OH (US); Brad S. Bryant, Yellow Springs, OH (US)

(73) Assignee: DAYTON-PHOENIX GROUP, INC., Dayton, OH (US)

( * ) Notice: Subject to any disclaimer, the term of this patent is extended or adjusted under 35 U.S.C. 154(b) by 429 days.

(21) Appl. No.: 14/162,323

(22) Filed: Jan. 23, 2014

(65) Prior Publication Data

US 2014/0132198 A1 May 15, 2014

Related U.S. Application Data

(62) Division of application No. 12/854,392, filed on Aug. 11, 2010, now Pat. No. 8,638,059.

(51) Int. Cl.
*H02P 25/18* (2006.01)
*H02P 23/03* (2006.01)
*H02P 29/00* (2016.01)

(52) U.S. Cl.
CPC .............. *H02P 25/184* (2013.01); *H02P 23/03* (2013.01); *H02P 29/0044* (2013.01); *H02P 2207/01* (2013.01)

(58) Field of Classification Search
CPC .................................. H02P 23/03; H02P 25/18
USPC .......................... 318/727, 767, 771, 778, 779
See application file for complete search history.

(56) References Cited

U.S. PATENT DOCUMENTS

| | | |
|---|---|---|
| 3,611,088 A | 10/1971 | Hill et al. |
| 3,935,519 A | 1/1976 | Pfarrer et al. |
| 3,978,382 A | 8/1976 | Pfarrer et al. |
| 3,982,167 A | 9/1976 | Espelage |
| 4,019,105 A | 4/1977 | Cornell et al. |
| 4,044,285 A | 8/1977 | Plunkett et al. |
| 4,228,846 A | 10/1980 | Smorol |
| 4,238,723 A | 12/1980 | Jenks |
| 4,306,182 A | 12/1981 | Curtiss |
| 4,361,793 A | 11/1982 | Nordell |
| 4,384,243 A | 5/1983 | Muskovac |
| 4,412,167 A | 10/1983 | Green et al. |

(Continued)

OTHER PUBLICATIONS

Office Action, U.S. Appl. No. 12/854,392 (Apr. 9, 2013).

(Continued)

*Primary Examiner* — Kawing Chan
(74) *Attorney, Agent, or Firm* — Thompson Hine LLP

(57) ABSTRACT

A method of controlling operation of a multi-phase induction motor may include transmitting a low-speed operation signal by a master computer to a control signal board for low-speed operation of the motor; the control signal board receiving the low-speed operation signal, and in response to the low-speed operation signal, the control signal board sensing that the master computer is not simultaneously transmitting a high-speed operation signal, and in response to receiving the low-speed operation signal and not simultaneously receiving the high-speed operation signal, closing contactors in a power section to transmit power to the motor for low-speed operation, whereby the motor is connected to a source of multi-phase power and operates at low-speed; and the control signal board transmitting a first feedback signal to the master computer that the motor is connected to the source of multi-phase power and is running at low speed.

20 Claims, 4 Drawing Sheets

(56) References Cited

U.S. PATENT DOCUMENTS

| | | |
|---|---|---|
| 4,417,194 A | 11/1983 | Curtiss et al. |
| 4,467,262 A | 8/1984 | Curtiss |
| 4,468,603 A | 8/1984 | Vander Meer et al. |
| 4,482,852 A | 11/1984 | Muskovac |
| 4,677,364 A | 6/1987 | Williams et al. |
| 4,723,104 A | 2/1988 | Rohatyn |
| 4,724,503 A | 2/1988 | Libert |
| 4,761,602 A | 8/1988 | Leibovich |
| 4,887,018 A | 12/1989 | Libert |
| 5,003,242 A | 3/1991 | Liber |
| 5,237,255 A | 8/1993 | Klatt |
| 5,243,268 A | 9/1993 | Klatt |
| 5,283,726 A | 2/1994 | Wilkerson |
| 6,163,129 A | 12/2000 | Younger et al. |
| 6,170,587 B1 | 1/2001 | Bullock |
| 6,250,904 B1 | 6/2001 | Reddy et al. |
| 6,384,568 B1 | 5/2002 | Schubert |
| 6,400,119 B1 | 6/2002 | Garza et al. |
| 6,445,332 B1 | 9/2002 | Younger et al. |
| 6,445,966 B1 | 9/2002 | Younger et al. |
| 6,459,606 B1 | 10/2002 | Jadrić |
| 6,462,976 B1 | 10/2002 | Olejniczak et al. |
| 6,489,742 B2 | 12/2002 | Lumsden |
| 6,542,390 B2 | 4/2003 | Bixel |
| 6,616,416 B1 | 9/2003 | Tolbert, Jr. |
| 6,647,328 B2 | 11/2003 | Walker |
| 6,659,815 B2 | 12/2003 | Motsenbocker |
| 6,680,997 B2 | 1/2004 | Das |
| 6,753,670 B2 | 6/2004 | Kadah |
| 6,847,531 B2 | 1/2005 | Bixel |
| 6,850,426 B2 | 2/2005 | Kojori et al. |
| 6,975,087 B1 | 12/2005 | Crabill et al. |
| 7,104,347 B2 | 9/2006 | Severinsky et al. |
| 7,170,767 B2 | 1/2007 | Bixel |
| 7,193,387 B1 | 3/2007 | Lu et al. |
| 7,215,097 B2 | 5/2007 | Myers |
| 7,224,557 B2 | 5/2007 | Kinsella et al. |
| 7,227,326 B1 | 6/2007 | Lu et al. |
| 7,237,634 B2 | 7/2007 | Severinsky et al. |
| 7,245,110 B2 | 7/2007 | Duff, Jr. |
| 7,259,357 B2 | 8/2007 | Walker |
| 7,265,513 B2 | 9/2007 | Hughes et al. |
| 7,298,105 B1 | 11/2007 | Lu et al. |
| 7,309,973 B2 | 12/2007 | Garza |
| 7,315,151 B2 | 1/2008 | Thompson et al. |
| 7,334,510 B2 | 2/2008 | Gerdes et al. |
| 7,342,371 B2 | 3/2008 | Zuzuly et al. |
| 7,358,507 B2 | 4/2008 | Van Santen |
| 7,358,700 B2 | 4/2008 | Qian et al. |
| 7,368,890 B2 | 5/2008 | Pande et al. |
| 7,378,816 B2 | 5/2008 | Mayhew |
| 7,378,821 B2 | 5/2008 | Simpson, III |
| 7,389,837 B2 | 6/2008 | Tamai et al. |
| 7,392,871 B2 | 7/2008 | Severinsky et al. |
| 7,425,806 B2 | 9/2008 | Schnetzka et al. |
| 7,455,134 B2 | 11/2008 | Severinsky et al. |
| 7,468,595 B2 | 12/2008 | Lee et al. |
| 7,520,353 B2 | 4/2009 | Severinsky et al. |
| 7,521,900 B2 | 4/2009 | Duff, Jr. |
| 7,536,936 B2 | 5/2009 | Gerdes et al. |
| 7,538,507 B2 | 5/2009 | Lu et al. |
| 7,561,396 B2 | 7/2009 | Song |
| 7,576,451 B2 | 8/2009 | Maclennan et al. |
| 7,595,613 B2 | 9/2009 | Thompson et al. |
| 7,602,132 B2 | 10/2009 | Davis et al. |
| 7,602,136 B2 | 10/2009 | Garza |
| 7,602,157 B2 | 10/2009 | Babcock et al. |
| 7,607,896 B2 | 10/2009 | Leuthen et al. |
| 2001/0045101 A1 | 11/2001 | Graham et al. |
| 2002/0067093 A1 | 6/2002 | Das |
| 2002/0085398 A1 | 7/2002 | Bixel |
| 2002/0101122 A1 | 8/2002 | Haines et al. |
| 2003/0169014 A1 | 9/2003 | Kadah |
| 2003/0231517 A1 | 12/2003 | Bixel |
| 2005/0013085 A1 | 1/2005 | Kinsella et al. |
| 2005/0219879 A1 | 10/2005 | Bixel |
| 2006/0049794 A1 | 3/2006 | Mayhew |
| 2007/0024250 A1 | 2/2007 | Simpson, III |
| 2007/0146958 A1 | 6/2007 | Babcock et al. |
| 2007/0182361 A1 | 8/2007 | Pande et al. |
| 2009/0058341 A1 | 3/2009 | Lu et al. |

OTHER PUBLICATIONS

Notice of Allowance, U.S. Appl. No. 12/854,392 (Sep. 20, 2013).

CONTROL FOR MULTI-PHASE INDUCTION MOTOR

FIELD

The present disclosure relates to electric motor control systems, and more particularly, to electric motor control systems for operation of multi-phase induction motors.

BACKGROUND

Induction motors frequently are used in industrial applications. A common type of induction motor (also known as an asynchronous motor) utilizes multi-phase, typically three-phase, alternating current (AC) to energize the stator coils. In industrial applications, such AC induction motors can be quite large, driven by high current to develop high torque output. It is often necessary to operate such motors in high-temperature, corrosive environments.

One common application for such large induction motors is in diesel-electric locomotives. In such an environment, AC induction motors may be controlled by the master computer that controls the electrical systems for the locomotive. The master computer typically sends operation signals to a control board having a controller that, in turn, operates switches to open and close connections between the motor and a source of three-phase electrical power produced by a diesel-electric AC generator.

In one application, which may be to drive an exhaust or cooling fan for the diesel engine enclosure, the AC induction motor is configured for either high-speed or low-speed operation. In high-speed operation, coils in a wye configuration are connected to a source of three-phase power, and in a low-speed configuration the coils connected in a delta configuration are similarly energized.

When operating such motors that ultimately are controlled by a master computer, it is desirable to avoid a situation in which shorting across coils may occur, as this may damage or burn up the motor. Conditions in which switches may become overheated may occur, which also may damage the system and motor. Further, as a result of operational or programming errors, the master computer may transmit signals to the motor controller for high-speed and low-speed operation simultaneously, which if implemented by the controller would damage the motor and the control system.

Accordingly, there is a need for a control system for an induction motor that is sufficiently robust to operate in harsh environments, and that minimizes the likelihood of motor damage as a result of shorting, high temperature or incorrect operation signals.

SUMMARY

In one embodiment, a method of controlling operation of a multi-phase induction motor may include transmitting a low-speed operation signal by a master computer to a control signal board for low-speed operation of the motor; receiving the low-speed operation signal by the control signal board, and in response to the low-speed operation signal, the control signal board sensing that the master computer is not simultaneously transmitting a high-speed operation signal, and in response to receiving the low-speed operation signal and not simultaneously receiving the high-speed operation signal, closing contactors in a power section to transmit power to the motor for low-speed operation, whereby the motor is connected to a source of multi-phase power and operates at low-speed; and the control signal board transmitting a first feedback signal to the master computer that the motor is connected to the source of multi-phase power and is running at low-speed.

In another embodiment, a method of controlling a three-phase AC induction motor may include transmitting a low-speed operation signal by a master computer to a control signal board for low-speed operation of the motor; receiving the low-speed operation signal by the control signal board, and in response to the low-speed operation signal, the control signal board sensing that the master computer is not simultaneously transmitting a high-speed operation signal, and in response to receiving the low-speed operation signal and not simultaneously receiving the high-speed operation signal, closing contactors in a power section to transmit power to the motor for low-speed operation, whereby the motor is connected in a delta configuration to a source of three-phase power from a diesel-electric generator in a locomotive environment and operates at low speed; and the control signal board transmitting a first feedback signal to the master computer that the motor is connected to the source of three-phase power and is running at low speed.

In yet another embodiment, a system for controlling operation of a multi-phase induction motor may include a power section having a plurality of contactors connected to a source of multi-phase power; a control signal board; a master computer configured to transmit a low-speed operation signal to the control signal board for low-speed operation of the multi-phase induction motor, and a high-speed operation signal to the control signal board for high-speed operation of the multi-phase induction motor; the control signal board configured to receive the low-speed operation signal from the master computer, and in response to the low-speed operation signal, the control signal board is configured to sense that the master computer is not simultaneously transmitting the high-speed operation signal, and in response to receiving the low-speed operation signal and not simultaneously receiving the high-speed operation signal, closing the plurality of contactors in the power section to transmit power to the multi-phase induction motor for low-speed operation, whereby the multi-phase induction motor is connected to the source of multi-phase power and operates at low speed; and the control signal board is further configured to transmit a first feedback signal to the master computer that the multi-phase induction motor is connected to the source of multi-phase power and is running at low speed.

Other aspects and advantages of the disclosed method and system will be apparent from the following description, the accompanying drawings and the appended claims.

DETAILED DESCRIPTION

Figure 1:
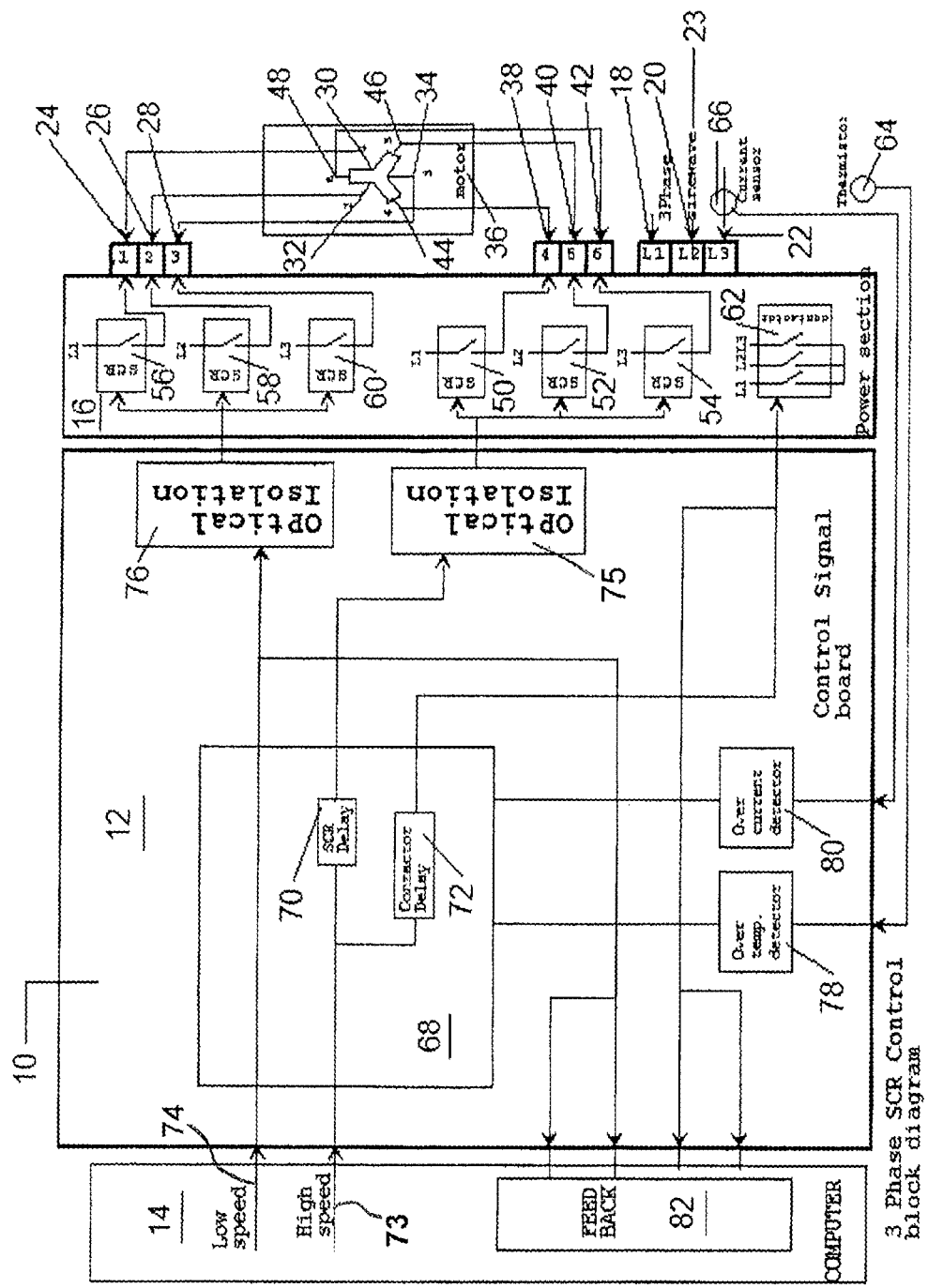
FIG. 1 is a schematic diagram of the disclosed control for a multi-phase induction motor, shown connected to receive three-phase AC power.

As shown in FIG. 1, an exemplary control, generally designated 10, may be used with a multi-phase induction motor 36. The control 10 may include a control signal board, generally designated 12, that may interface with a master computer, generally designated 14, and a power section 16. The power section 16 may include terminals 18, 20, 22 that are connected to a source of multi-phase alternating current, such as a source of three-phase alternating current 23. Typically, in a locomotive environment, the source 23 of three-phase power may be supplied from a diesel-electric generator (not shown) at 400 volts. Both frequency and voltage from the diesel-electric generator are determined by the diesel engine RPM. The diesel-electric generator operates in a constant volts-per-hertz fashion.

The power section 16 may include terminals 24, 26, 28 that connect to stator terminals 30, 32, 34 of AC induction motor 36 for a delta stator configuration. Similarly, terminals 38, 40, 42 of the power section 16 may be connected to terminals 44, 46, 48, respectively, of motor 36 in a wye stator winding configuration. In one aspect, the motor 36 may be a cooling fan motor for a diesel-electric engine, but the disclosed control 10 may be used in a variety of environments and applications.

Switches, such as silicon controlled rectifier (SCR) pairs 50, 52, 54 of power section 16, may be connected to inputs 18, 20, 22, respectively, and to terminals 38, 40, 42, respectively. SCR pairs 50, 52, 54 control current flow to terminals 44, 46, 48, respectively. SCR pairs 56, 58, 60 of power section 16 may be connected to terminals 18, 20, 22, respectively, and to terminals 24, 26, 28, respectively. Thus, SCR pairs 56, 58, 60 may be closed to direct power to terminals 30, 32, 34 of motor 36 to energize a delta configuration. Other switches may be employed, such as other types of solid-state switches or thyristors.

Power section 16 also may include contactor 62 for switching the motor 36 between delta and wye stator winding configurations. Power section 16 also may include a thermistor 64 that may be connected to detect the temperature of the SCR pairs 50, 52, 54, 56, 58, 60, and a current sensor 66, which may be connected to sense the current to the power section and to the motor 36.

The control signal board 12 may include controller 68 having an SCR delay 70 and a contactor delay 72. The controller 68 is connected to the master computer 14 to receive a high-speed signal through high-speed input 73 and a low-speed signal through low-speed input 74 The controller 68 may be connected to actuate SCR pairs 50, 52, 54 through optical isolator 75, and connected to actuate SCR pairs 56, 58, 60 through optical isolator 76. The control signal board 12 also may include an over-temperature detector 78 that receives a signal from the thermistor 64 and is connected to the controller 68. Control signal board 12 also may include an over-current detector 80 that may be connected to and receive a signal from current sensor 66 and transmits a digital signal to controller 68.

The control signal board 12 also may be connected to a feedback module 82 of the master computer 14. Signals representing fault conditions (over temperature and over current), and the status of motor operation (high-speed, low-speed, off) may be transmitted from the control signal board 12 to the feedback module 82.

Figure 2:
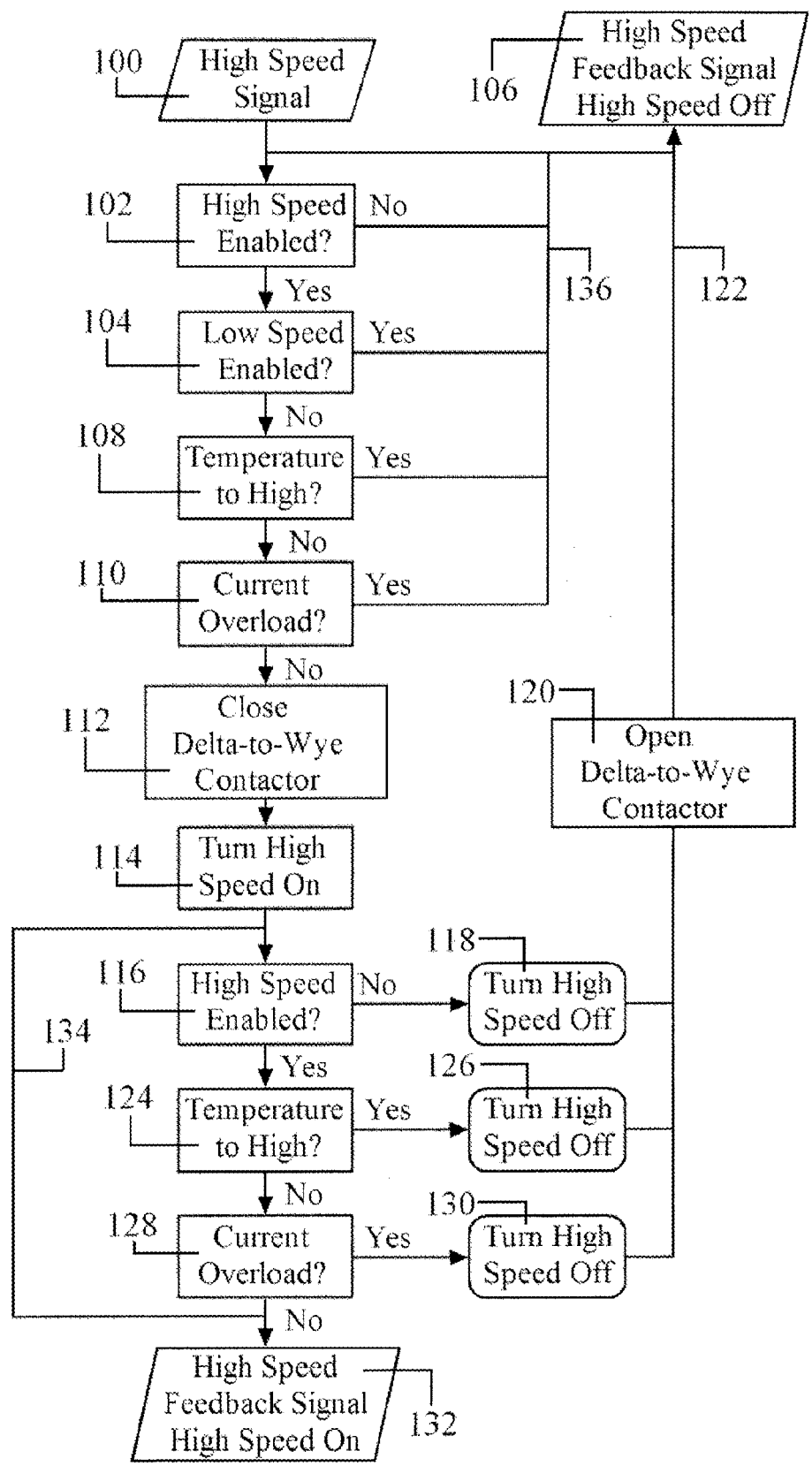
FIG. 2 is a flow chart showing operation of the control circuit board of the system of FIG. 1 for high-speed motor operation.

The operation of the system 10 described with reference to FIG. 1 in high-speed mode is shown in FIG. 2. As indicated in block 100, the control signal board 12 (see FIG. 1) may receive a high-speed enable signal from master computer 14 to high-speed input 73, indicating that the system 10 is to operate the motor 36 at high-speed. This high-speed enable signal may be generated continuously by the master computer 14 as shown in block 102. The controller 68 of control signal board 12 may receive the high-speed signal and, as indicated in block 104, determine whether a low-speed enable signal is being transmitted simultaneously by master computer 14 to low-speed input 74.

If no high-speed signal is enabled, as shown in block 102, the control 68 may generate a feedback signal, indicated at block 106, that is sent to the feedback module 82 of master computer 14 to signal the master computer of this condition. The controller 68 may not enable high-speed operation of the motor 36 in this condition, as indicated in block 106. If, as shown in block 104, a low-speed signal is also generated by the master computer and received by the controller 68 simultaneously with the high-speed signal, as indicated in block 106, the control 68 may send a feedback signal to feedback module 82 to turn off the high-speed signal.

As indicated in block 108, if a high-speed signal is generated and no low-speed signal is present, the control 68 may then determine whether the temperature of the switches 50-60 is within an acceptable temperature range. This signal may be transmitted from thermistor 64, through over-temperature detector 78 to control 68. As indicated in block 108, if an over-temperature condition exists, the control may generate a feedback signal to feedback module 82, as indicated in block 106, to indicate this state. The controller 68 will not enable high-speed operation of the motor 36 with the presence of this fault condition.

As shown in block 110, the control 68 also may detect a current signal sent from sensor 66 through over-current detector 80 to control 68. If an overload fault condition exists, then, as indicated in block 110, a feedback signal indicative of this fault condition may be sent from the controller 68 to feedback module 82, and the controller may turn off the high-speed operation signal, as indicated in block 106, and shut off motor 36.

If no current overload conditions exist, as indicated in block 110, the control 68 may close the delta-to-wye contactor, as indicated in block 112. This represents a signal from control 68 through optical isolator 75 to actuate SCR pairs 50, 52, 54 to energize the wye windings 44, 46, 48 of motor 36 for high-speed operation. This high-speed operation is indicated in block 114. In order to prevent closing contactors 62 in power section 16 while energized, SCR delay 70 delays energizing the windings by delaying the closing of SCR pairs 50-54 until after the contactors of the power section have closed. This is indicated by contactor closing block 112 occurring before closing high-speed SCR block 114 in the flow chart of FIG. 2.

At this point, the motor 36 is operating at high speed. During high-speed operation, as indicated in block 116, the control 68 may continue to monitor the high-speed signal, which may be transmitted continuously by master computer 14. If that signal stops, as indicated in block 118, the controller 68 may actuate SCR pairs 50-54 to cut power to the motor 36. Also, as indicated in block 120, subsequent to opening SCR pairs 50-54, the control 68 may open the delta-to-wye contactor 62 of power section 16. The delay in opening the contactor is effected by contactor delay 72. The control 68 also may generate a feedback signal indicated at 122 so that the system operates in a standby mode that begins with block 102 and continues as described previously.

Similarly, as indicated in block 124, during operation of the motor 36 at a high-speed configuration, the switch temperature may be monitored by way of thermistor 64 and over-temperature detector 78. In an over-temperature fault situation, as indicated in block 126, the control 68 may actuate SCR pairs 50-54 to cut power to motor 36, and as indicated in block 120, also subsequently open the delta-to-wye contactor 62 of power section 16, which is delayed by contactor delay 72. The system then, as indicated in feedback loop 122, may enter a standby mode, which may begin with block 102 with the control 68 waiting for a high-speed operation signal from master computer 14.

As indicated at block 128, during motor operation, the current to the motor may be constantly monitored by current sensor 66, and if an over-current situation occurs, over-current detector 80 may send a signal to control 68. In such an instance, as indicated in block 130, the control 68 may actuate SCR pairs 50-54 to cut power to the motor and, as indicated in block 120, subsequently may open the delta-to-wye contactor 62, delayed by contactor delay 72. Again, as indicated with feedback 122, the system may enter a standby mode that begins with waiting for a high-speed signal, as indicated at block 102.

As indicated at block 132, the controller 68 of control signal board may provide a feedback signal to feedback module 82 of computer 14 constantly during operation that the motor 36 is operating at high speed. This high-speed feedback signal occurs only if, as shown in FIG. 2, a high-speed signal is being received from the master computer 14 and fault conditions do not exist: the switch temperature is within acceptable limits and the current to the motor 36 is not in an overload condition. As indicated by arrow 134, during high-speed operation of the motor 36, the controller 68 may operate continuously in a running loop in which the high-speed signal from the master computer 14 is detected, shown in block 116, temperature is monitored, as indicated in block 124, and current is monitored, as shown in block 128.

Similarly, prior to motor operation, the system may be configured to operate controller 68 in a standby loop, as indicated by line 136, in which the controller may wait to receive a high-speed signal, indicated at block 102, or a low-speed signal, indicated at block 104. Temperature and current also may be monitored at this time, as indicated by blocks 108, 110, respectively.

Figure 3:
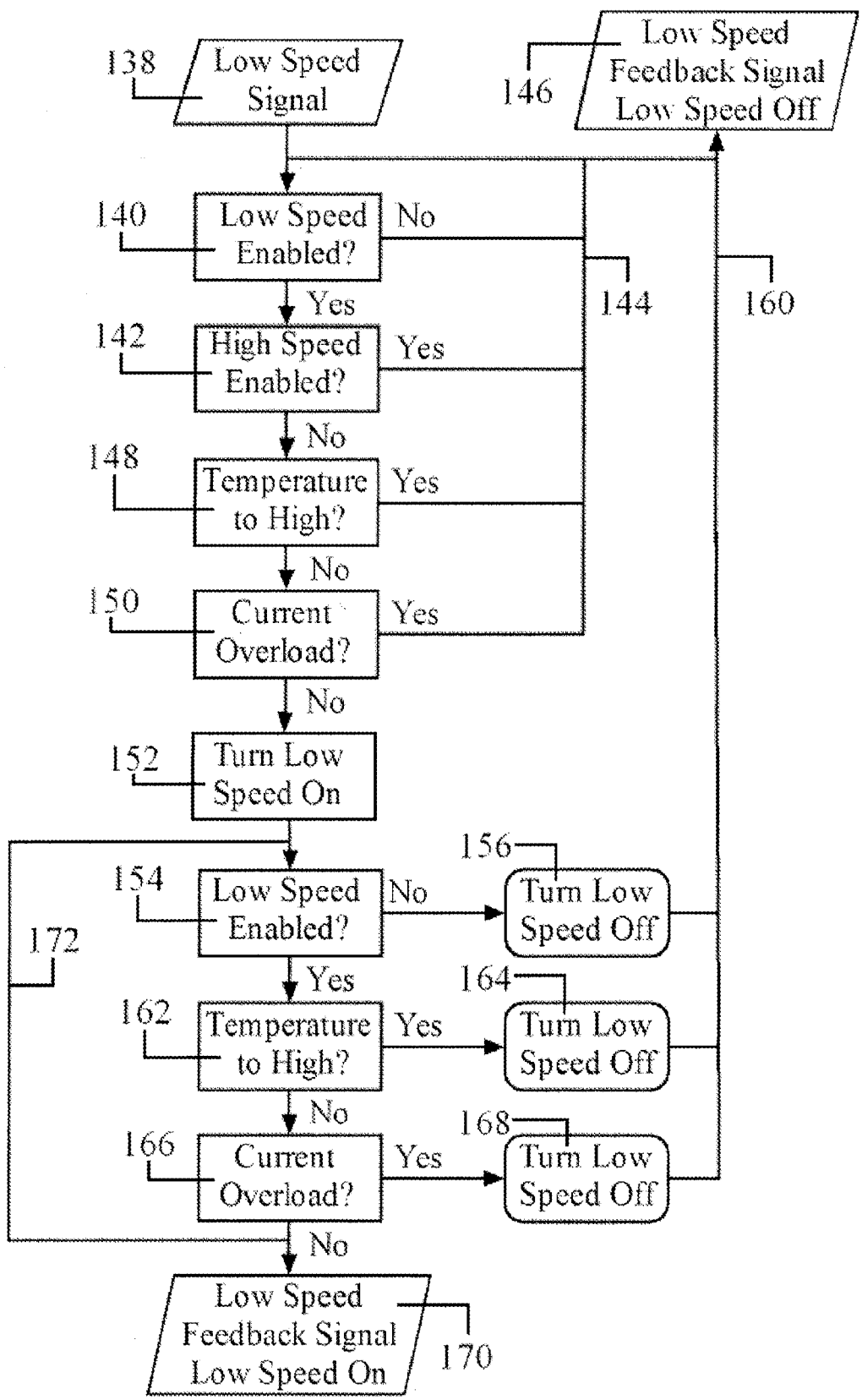
FIG. 3 is a flow chart showing operation of the control circuit board of the system of FIG. 1 for low-speed motor operation.

As shown in FIG. 3, the system may be configured to operate the motor 36 at a low speed. This mode of operation may begin, as indicated in block 138, with receipt by the controller 68 of a low-speed signal from master computer 14 through low-speed input 74 (see FIG. 1). As indicated in block 140, the controller 68 may confirm that a low-speed signal is being received from the master computer 14 and, as indicated in block 142, verify that a high-speed signal is not being transmitted by master computer 14 through high-speed input 73 simultaneously. In the event that the low-speed signal ceases, as indicated by feedback loop 144, the control may generate a low-speed feedback signal, indicated at block 146, to tell the master computer 14 that the low-speed signal has stopped. In this situation, the controller 68 does not operate the motor 36, as indicated in block 146.

If only a low-speed signal is being transmitted, then, as indicated in block 148, prior to operation the system may monitor the temperature of the SCR pairs 56-60 by way of thermistor 64. If the temperature is within an acceptable range and not in a fault condition, then the controller 68 may monitor the presence of a current overload, as indicated by block 150. If either a fault condition exists with respect to switch temperature, or a fault condition exists with respect to a current overload, then, as indicated by feedback loop 144, a feedback signal may be sent to the feedback module 82 of computer 14 indicating this fault condition. Also, the controller 68 may stop low-speed operation of the motor 36, as indicated at block 146. In the event that no fault condition exists, then, as indicated at block 152, the control 68 may send a signal through optical isolator 76 to close SCR pairs 56-60 to energize motor 36 in a low-speed or delta configuration.

During operation, the controller 68 may continue to receive low-speed signals from the master computer 14, as indicated in block 154. In the event that these signals cease, as indicated in block 156, the controller 68 turns off the power to the motor 36 by actuating SCR pairs 56-60 and generates a feedback signal 160 to the master computer 14 indicating this condition, as indicated at block 146.

Similarly, as indicated in block 162, the controller 68 receives a temperature signal from thermistor 64 in the event of an over-temperature fault condition. In the event of such condition, as indicated in block 164, the controller 68 may open SCRs 56-60 to cut power to the motor 36 and generate a signal to the master computer 14 indicating condition. This signal may be transmitted by way of feedback signal 160.

Further, during operation of the motor 36 in a low-speed configuration, the controller 68 may monitor the current to the motor, as indicated at block 166, and if a fault condition occurs, such as may occur with a short across the motor winding, the controller 68 may actuate SCR pairs 56-60 to turn off the motor 36, as indicated at block 168. At the same time, a feedback signal 160 may be sent by controller 68 to the feedback module 82 of computer 14, as indicated in block 146. The controller 68 then enters standby loop 144, in which the controller waits to receive a signal from the computer 14 that low or high-speed motor operation is enabled (blocks 140, 142, respectively) and temperature and current are not in fault conditions (blocks 148, 150, respectively).

If no fault condition exists, then as indicated in block 170, the controller 68 may generate a feedback signal to the computer feedback module 82 that the motor 36 is operational at low-speed. As indicated at 172, during operation the controller 68 may operate in a running loop during which the continued receipt of a low-speed operation signal (block 154), high temperature fault condition (block 162) and current overload (block 166) fault conditions may be monitored continuously by the controller. Similarly, prior to motor operation, as indicated at 144, the controller 68 may operate in a standby loop during which the controller waits for a low-speed signal, indicated at block 140, or a high-speed signal, indicated at block 142, and also monitors temperature and current fault conditions, as indicated at blocks 148, 150, respectively.

Figure 4:
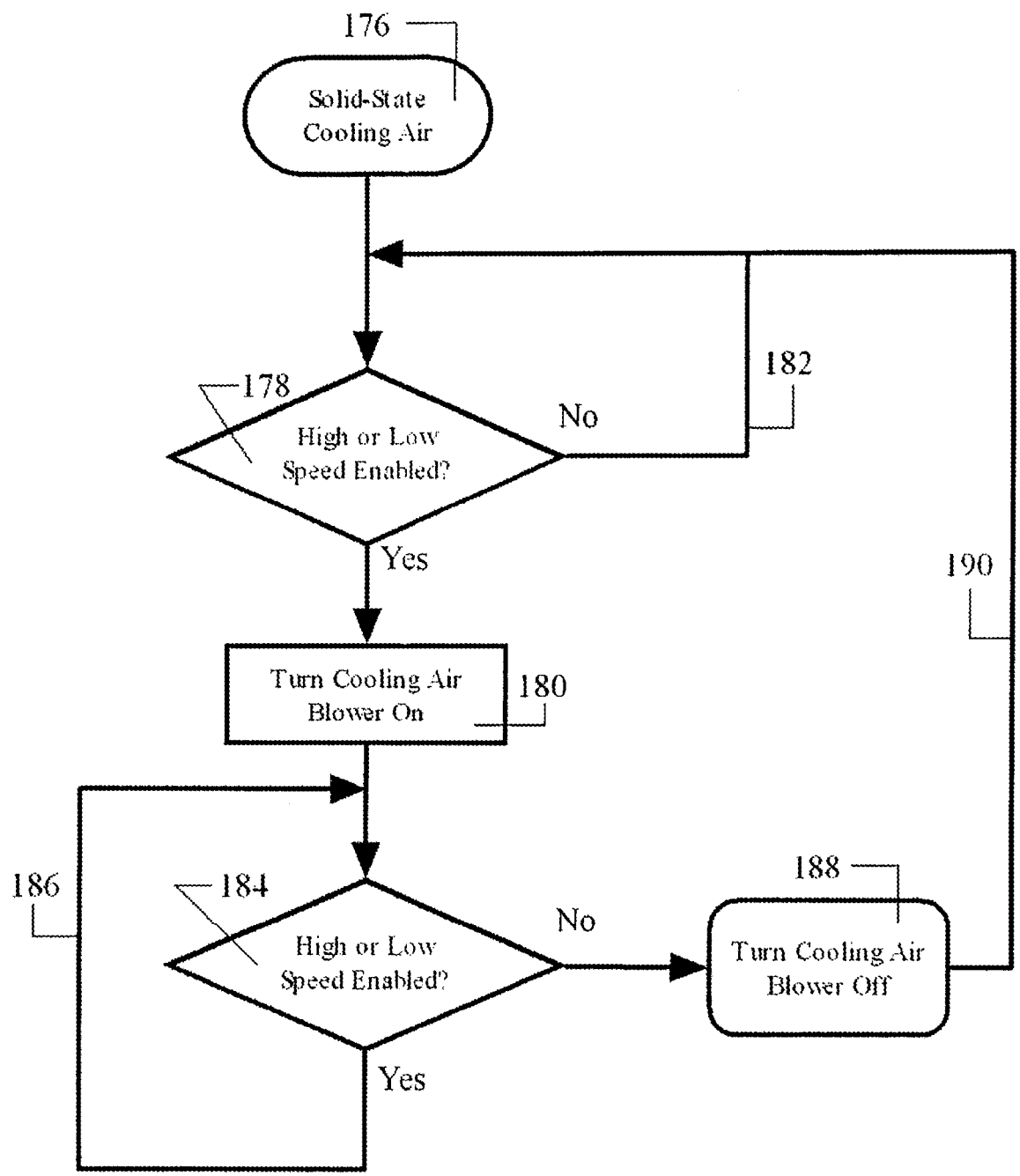
FIG. 4 is a flow chart showing operation of a cooling fan by the system of FIG. 1.

As shown in FIG. 4, the controller 68 may be used to actuate cooling air, indicated at block 176. If, as indicated in diamond 178, high or low-speed operation is enabled, then the controller 68 may actuate a cooling air blower, indicated at block 180. If not receiving an operations signal, as indicated at diamond 178, the system 10 may enter a standby mode in which the receipt of a signal is monitored, as indicated at 182.

During operation of the cooling air blower, as indicated at diamond 184, the system may continue to monitor the receipt of a high or low-speed operation signal. If either such signal is received, the cooling air blower continues to operate and the system operates in a running loop, indicated at 186. However, if the high or low-speed signal is not received, then as indicated at block 188, the controller 68 turns off the blower and enters a standby mode, as indicated at 190.

The disclosed system 10 and method for operating a multi-phase, multi-speed induction motor is designed to minimize damage to the motor that might result from a fault condition such as a current overload or from overheated switches. Thus, the system 10 may protect not only the motor 36, but the power section 16 and control signal board 12 itself. Further, the master computer 14 receives feedback signals from the control signal board 12 at all times during operation so that the state of the motor 36 and the condition of the system 10 may be displayed to an operator on a display screen (not shown) connected to the master computer.

While the forms of apparatus and methods disclosed constitute preferred embodiments of the disclosed method and apparatus for controlling a multi-phase induction motor, it is to be understood that variations of the apparatus and methods may be made therein without departing from the scope of the invention.

What is claimed is:

1. A method of controlling operation of a multi-phase induction motor, the method comprising:
   transmitting a low-speed operation signal by a master computer to a control signal board for low-speed operation of the motor;
   receiving the low-speed operation signal by the control signal board, and in response to the low-speed operation signal, the control signal board
   sensing that the master computer is not simultaneously transmitting a high-speed operation signal, and
   in response to receiving the low-speed operation signal and not simultaneously receiving the high-speed operation signal, closing contactors in a power section to transmit power to the motor for low-speed operation, whereby the motor is connected to a source of multi-phase power and operates at low-speed; and
   the control signal board transmitting a first feedback signal to the master computer that the motor is connected to the source of multi-phase power and is running at low-speed.

2. The method of claim 1, further comprising the control signal board receiving a first fault condition signal from a first sensor indicating a first fault condition, and in response to the first fault condition signal, the control signal board transmitting a second feedback signal to the master computer indicating existence of the first fault condition.

3. The method of claim 2, further comprising the control signal board opening the contactors in the power section in response to receiving the first fault condition signal, whereby the motor is disconnected from the source of multi-phase power.

4. The method of claim 3, wherein the fault condition includes one or both of an over-temperature condition of the contactors in the power section and an over-current supplied to the motor.

5. The method of claim 4, wherein the control signal board opening the contactors in the power section includes the control signal board transmitting a signal to the power section.

6. The method of claim 1, further comprising the control signal board receiving signals from a first sensor representative of a current to the motor, and in response to the current to the motor exceeding a predetermined value, the control signal board transmitting a second feedback signal to the master computer that a fault condition exists.

7. The method of claim 6, further comprising the power section opening the contactors in response to receiving the second feedback signal from the control signal board.

8. The method of claim 7, further comprising the control signal board receiving signals from a second sensor representative of a temperature of the contactors in the power section, and in response to the temperature exceeding a predetermined value, the control signal board transmitting a second feedback signal to the master computer that a fault condition exists.

9. The method of claim 1, further comprising the control signal board performing a standby loop; and the control signal board transmitting a signal to a power section to close the contactors if a fault condition does not exist.

10. The method of claim 9, wherein the control signal board performing a standby loop includes the control signal board
    detecting whether the low-speed operation signal is being transmitted by the master computer;
    detecting whether a high-speed operation signal is being transmitted by the master computer simultaneously;
    receiving a first signal from a first sensor representative of a temperature of the contactors in the power section; and
    receiving a second signal from a second sensor representative of a current to the motor.

11. The method of claim 10, wherein transmitting the signal to the power section to close the contactors is performed by the control signal board in response to detecting a low-speed operation signal being transmitted by the master computer, detecting no high-speed operation signal being transmitted by the master computer, the signal from the first sensor indicating that the contactor temperature is below a predetermined value, and the signal from the second sensor indicating that the current to the motor is not in an overload condition.

12. The method of claim 1, further comprising the control signal board performing a running loop; and if no fault conditions exist, the control signal board transmitting a low-speed operation feedback signal to the master computer.

13. The method of claim 12, wherein the control signal board performing the running loop includes the steps of the control signal board
    detecting whether the low-speed signal is being transmitted by the master computer;
    receiving a first signal from a first sensor representative of a temperature of the contactors in the power section; and
    receiving a second signal from a second sensor representative of a current to the motor.

14. The method of claim 13, wherein transmitting the low-speed operation feedback signal to the master computer is performed by the control signal board in response to detecting a low-speed signal being transmitted by the master computer, the signal from the first sensor indicating that the temperature of the contactors in the power section is below a predetermined value, and the signal from the second sensor indicating that the current to the motor is not in an overload condition.

15. The method of claim 14, further comprising the control signal board transmitting a second signal to the master computer that a fault condition exists in the event that a fault condition is detected by the control signal board.

16. The method of claim 15, wherein transmitting the second signal to the master computer is performed by the control signal board in response to detecting at least one of an absence of a low-speed operation signal being transmitted by the master computer, the signal from the first sensor indicates that a temperature of the contactors in the power section is above a predetermined value, and the signal from the second sensor indicating that the current to the motor is in an overload condition.

17. The method of claim 16, further comprising the control signal board transmitting a third signal to the power section to open the contactors in response to detecting at least one of the signal from the first sensor indicating that the temperature of the contactors in the power section is above a predetermined value and the signal from the second sensor indicating that the current to the motor is in an overload condition.

18. The method of claim 1, wherein closing contactors in a power section includes controlling three silicon-controlled rectifiers.

19. A method of controlling a three-phase AC induction motor, the method comprising:
   transmitting a low-speed operation signal by a master computer to a control signal board for low-speed operation of the motor;
   receiving the low-speed operation signal by the control signal board, and in response to the low-speed operation signal, the control signal board
      sensing that the master computer is not simultaneously transmitting a high-speed operation signal, and
      in response to receiving the low-speed operation signal and not simultaneously receiving the high-speed operation signal, closing contactors in a power section to transmit power to the motor for low-speed operation, whereby the motor is connected in a delta configuration to a source of three-phase power from a diesel-electric generator in a locomotive environment and operates at low speed; and
   the control signal board transmitting a first feedback signal to the master computer that the motor is connected to the source of three-phase power and is running at low speed.

20. A system for controlling operation of a multi-phase induction motor, the system comprising:
   a power section having a plurality of contactors connected to a source of multi-phase power;
   a control signal board;
   a master computer configured to transmit a low-speed operation signal to the control signal board for low-speed operation of the multi-phase induction motor, and a high-speed operation signal to the control signal board for high-speed operation of the multi-phase induction motor;
   the control signal board configured to receive the low-speed operation signal from the master computer, and in response to the low-speed operation signal, the control signal board is configured to sense that the master computer is not simultaneously transmitting the high-speed operation signal, and in response to receiving the low-speed operation signal and not simultaneously receiving the high-speed operation signal, closing the plurality of contactors in the power section to transmit power to the multi-phase induction motor for low-speed operation, whereby the multi-phase induction motor is connected to the source of multi-phase power and operates at low speed; and
   the control signal board is further configured to transmit a first feedback signal to the master computer that the multi-phase induction motor is connected to the source of multi-phase power and is running at low speed.

* * * * *